US008292315B1

(12) United States Patent
Pelkonen

(10) Patent No.: US 8,292,315 B1

(45) Date of Patent: Oct. 23, 2012

(54) THREE WHEELED BODY LEAN VEHICLE WITH DYNAMIC ARTICULATION AXIS

(76) Inventor: Arne E. Pelkonen, Toronto (CA)

( * ) Notice: Subject to any disclaimer, the term of this patent is extended or adjusted under 35 U.S.C. 154(b) by 10 days.

(21) Appl. No.: 13/108,324

(22) Filed: May 16, 2011

(51) Int. Cl.
*B62K 5/06* (2006.01)

(52) U.S. Cl. .................................... 280/266; 280/288.1

(58) Field of Classification Search .................. 280/266, 280/288.1

See application file for complete search history.

(56) References Cited

U.S. PATENT DOCUMENTS

| | | | | |
|---|---|---|---|---|
| 4,198,072 | A | 4/1980 | Hopkins | |
| 4,359,231 | A | 11/1982 | Mulcahy | |
| 4,432,561 | A | 2/1984 | Feikema et al. | |
| 4,572,535 | A | 2/1986 | Stewart et al. | |
| 4,789,173 | A | 12/1988 | Lofgren et al. | |
| 5,568,935 | A | 10/1996 | Mason | |
| 6,062,581 | A | 5/2000 | Stites | |
| 6,105,986 | A | 8/2000 | Franks et al. | |
| 6,572,130 | B2 | 6/2003 | Greene, Jr. et al. | |
| D485,514 | S | 1/2004 | Berg | |
| 6,988,741 | B2 * | 1/2006 | Borochov et al. | 280/282 |
| 7,543,829 | B1 * | 6/2009 | Barnes | 280/62 |

* cited by examiner

*Primary Examiner* — Tony Winner

(74) *Attorney, Agent, or Firm* — Kyle R. Satterthwaite; Ryan W. Dupuis; Ade & Company Inc.

(57) ABSTRACT

A three wheeled vehicle features a front frame, a seat thereon, a front wheel on the front frame, a rear frame, and a pair of wheels on the rear frame. A flexible joint exists between the front and rear frame sections ahead of the seat and rear wheels and behind the front wheel to enable relative pivoting of the front frame about a tiltable axis. A pair of link arms each have spherical joints with the front and rear frames at opposite sides thereof at a distance behind the flexible joint. A dynamic articulation axis intersects the flexible connection and an axis passing through the connections of the link arms to the front frame. The front frame is tiltable relative to the rear frame to shift the dynamic axis relative to either side from a default position positioning the front wheel in a straight orientation relative to the rear wheels.

20 Claims, 7 Drawing Sheets

47L
47R
32
44
45
5L
5R
55

27
52
59
54
59
54
18
13
5R
32
5L
14
9R
9L
11R
11L
3
7
44
49R
29
50
50
29
12R
2
12L
45
49L
53
6
1
47R
47L 27
39
37A
37R
37C
36
42
36A
59
59
5L
35
5R
57
51L
51R
11L
11R
32
46R
46L
7
29
45
44
49R
49L
12L
12R
53R
53L
1
47R
47L 21
22
10
24
19
24
23
24
20
58

25A
25
31A
31R
25B
31C
31D
31B
27A
27B
27C

THREE WHEELED BODY LEAN VEHICLE WITH DYNAMIC ARTICULATION AXIS

FIELD OF THE INVENTION

The present invention relates generally to three wheeled vehicles, and more particularly to three wheeled vehicles with relatively movable frame sections responsive to leaning or body tilting by the rider.

BACKGROUND OF THE INVENTION

Tricycles by their nature are inherently self-balancing, due to their triangulated footprint. Conventional tricycles disadvantages only become apparent at speed when directional changes are required, as conventional fixed frame vehicles do not have the ability to counteract centrifugal forces induced by directional change. The only force available to offset this is made by the operator in shifting their weight to counteract this force. Unfortunately this is seldom enough to put the conventional tricycle on par with a conventional bicycle in terms of handling at speed. The advantage of the bicycle in this regard, is its ability to be leaned into corners as an option to counteract the centrifugal forces induced during directional change at speed.

Some prior art tricycle designs are not conventional and do have the ability to be leaned whilst being turned, but those that are known to the applicant lack the unique combination of features and resulting functional performance described herein for the present invention.

Examples of prior art three wheeled vehicles include those disclosed in U.S. Pat. Nos. 4,198,072, 4,359,231, 4,432,561, 4,572,535, 4,789,173, 5,568,935, 6,062,581, 6,105,986, 6,572,130 and D485514.

SUMMARY OF THE INVENTION

According to a first aspect of the invention there is provided a vehicle comprising:

a front frame section;

a seat for a rider carried on said front frame section;

a front wheel rotatably journaled on said front frame section at a front axle axis at a distance ahead of the seat;

a rear frame section;

a pair of rear wheels spaced transversely from one another and rotatably journaled on the rear frame section adjacent opposite sides thereof at a rear axle axis at a distance behind the front axle axis;

a flexible joint between the front and rear frame sections at a location disposed ahead of the seat and the rear axle axis and behind the front axle axis, the flexible joint enabling relative pivoting of the frame sections about a tiltable axis of said flexible joint; and a pair of link arms connected between the front and rear frames at a distance behind the flexible joint, each link arm inclining from a first connection to the rear frame adjacent a first side thereof to a second connection to the front frame, each connection of each link arm enabling pivoting thereof about three orthogonal axes;

wherein a dynamic articulation axis intersects the flexible connection and an imaginary axis extending through the second connections of the link arms to the front frame, the front frame being tiltable relative to the rear frame to shift the dynamic axis relative to either side from a default position positioning the front wheel in a straight orientation relative to the rear wheels.

What differentiates this vehicle from those is the unique combination of elements establishing the variable geometry of the pivot axis that provides for a vehicle that is high speed stable and low speed maneuverable thru only mechanical design.

Preferably the flexible connection comprises an elastomeric spacer disposed between parts of the front and rear frames and a fastener interconnecting said parts of said frames through a hole in the elastomeric spacer, an axis of the fastener defining the tiltable axis of the flexible connection.

Preferably the fastener is seated on one of said parts by a spherical bearing accommodating the tilting of the fastener relative to the one of said parts.

Preferably there is provided a second elastomeric member disposed to a side of the other part opposite the one part featuring the spherical bearing, the fastener additionally passing through said second elastomeric member.

Preferably the second elastomeric is frustoconical in shape and increases in width moving toward the parts of the front and rear frames.

Preferably the fastener comprises a bolt.

Preferably the connections of each link arms to the front and rear frames comprise spherical joints.

Preferably the connection of each link arm to the front frame occurs on a respective side of a longitudinal plane of the front frame in which the front wheel rotatably lies.

Preferably there is provided multiple link rod connection points on each side of the longitudinal plane of the front frame, the connection of each link arm to the front frame being selectively releasable for reconnection at a different selected one of said connection points to change the position of said connection to the front frame.

Preferably the link arms are positioned behind the seat.

Preferably a position of the seat along the front frame is adjustable.

Preferably a series of seat-engagement areas are defined at spaced positions along the front frame, the seat being selectively disengagable from any of said engagement areas and re-engagable to the front frame at another of said engagement areas.

Preferably the seat engagement areas comprise slots in longitudinal members of the front frame, the seat comprising transverse cross members sized to seat within the slots.

Preferably a reclining angle of a seat-back portion of the seat is adjustable.

Preferably the seat back portion of the seat is pivotally connected to a seat-bottom portion of the seat and a seat back adjustment device is operable to selectively change a relative point of locking engagement between the seat back and the front frame.

Preferably there is provided a series of slots and a lock engagement point on opposing ones of the front frame and the seat back, and a locking member selectively engagement with said lock engagement point through any of said slots.

Preferably the series of slots are provided in a bracket pivotally carried on a respective one of the seat back portion and the front frame and a position of the seat bottom along the front frame is adjustable, pivoting of the bracket accommodating relocation of the of the seat bottom portion.

The vehicle preferably features a steering handle extending upward from the front frame at position laterally outward from the seat on each side thereof proximate a front end of the seat, each steering handle being pivotal relative to the front frame about a transverse axis extending thereacross; and a respective steering link connected between each steering handle and the rear frame on the same side of the seat as said steering handle, connections of each steering link to the steering handle and rear frame at opposites ends of said steering link being pivotal about three orthogonal axes.

Preferably the dynamic articulation axis intersects the ground ahead of a contact point of the front wheel with the ground.

Preferably, with the front wheel in its straight orientation, the dynamic articulation axis intersects the ground at an angle of between 15 and 40 degrees inclining upward and reward from the ground. More preferably this angle is between 25 and thirty degrees, and in one embodiment is 27.5 degrees.

BRIEF DESCRIPTION OF THE DRAWINGS

In the accompanying drawings, which illustrate an exemplary embodiment of the present invention.

LIST OF REFERENCE CHARACTERS

Figure 1:
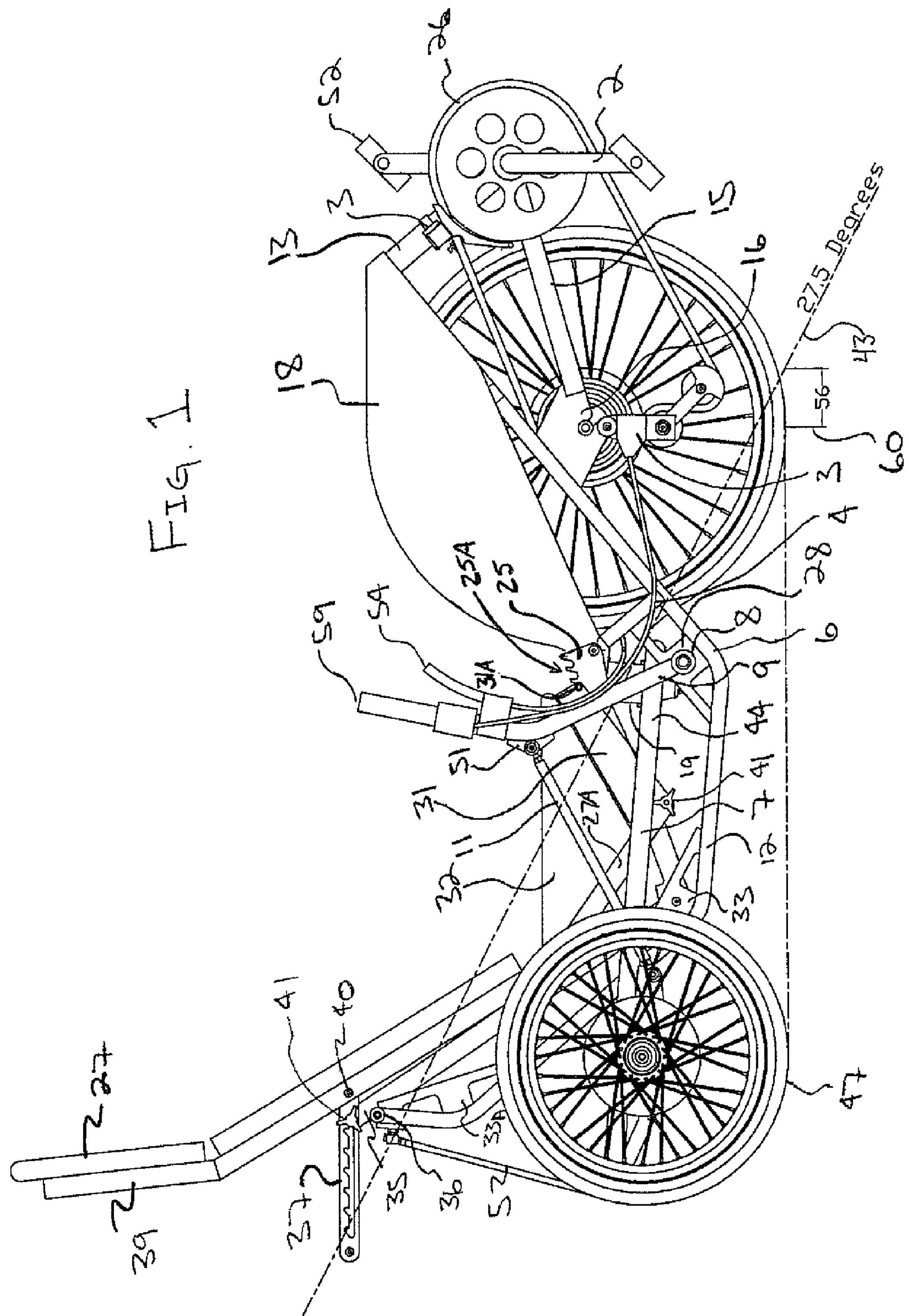
FIG. 1 is a side elevational view of a three-wheeled lean-steer pedal vehicle of the present invention

1 Front wheel
2 Crank assembly
3 Derailleurs
4 Pivot bushing support structure
5 Spherically ended link bars (frame)
6 Front frame
7 Rear frame
8 Steering pivot center
9 Steering handle bars
10 Front frame bushing plate
11 Spherically ended link bars (steering)
12 Frame Tubes
13 Derailleur mast
14 Bottom bracket (crank bearing housing)
15 Chain stays
16 Wheel brackets
17 Pivot support frame brace
18 Fender
19 Pivot Bushing (cylindrical)
20 Pivot Bushing (conical)
21 Pivot Bushing Thru bolt
22 Spherical bearing (thru bolt)
23 Rear Frame Bushing plate
24 Bushing Pilot ring
25 Seat support Rails
26 Chain and Sprocket
27 Seat Backrest
28 Steering pivot Gussets
29 Steering pivot shaft
30 Shaft collars
31 Seat adjuster mechanism
32 Seat base
33 Common Bracket
34 Seat Support cross member
35 Seat backbone
36 Upper spherical end attachment plate
37 Seat recline adjuster assembly
38 Recline adjuster barrel
39 Seat back C-channel
40 Recline adjuster pivot
41 Thumb Screws
42 Spherical end (frame)
43 Pivot Axis
44 Rear Axle Frame
45 Rear Axle tube
46 Rear Wheel brackets
47 Rear Wheels
48 Rear Axle end caps
49 Rear Axle Spindles
50 Steering Pivot Bushings
51 Steering Linkage Mounting tabs
52 Pedals
53 Brake Calipers
54 Brake Levers
55 Vehicle Centerline
56 Castor or Trail
57 Offset from Centerline
58 Cup Washer
59 Gear Shifter and grips
60 Perpendicularity of axle Centerline to ground

DETAILED DESCRIPTION

The following pages describe a preferred embodiment lean-steering vehicle with a variable, dynamic and progressive pivot axis achieved through mechanical interconnection between the front and rear wheels to achieve a three-wheeled vehicle with improved handling characteristics.

A single front wheel is centered, and parallel to the vehicle centerline when in a normal vertically oriented position tending to direct the vehicle in a straight line. The remaining two wheels are at the rear of the vehicle and are equidistant and symmetrical to the vehicle's centerline. The front wheel is independently framed from the rear wheels. The rear wheels share a common frame and axle. The front wheel articulates relative to the rear wheels. This axis of articulation is not a fixed axis but a variable axis. The axis of articulation is dynamic and progressive and variable as a result of operator input. The result of operator input is re-orientation of the front wheel by way of pivoting, tilting and rotation of the front wheel relative to the rear wheels. This re-orientation of the front wheel imparts directional change of the vehicle when in motion. This movement is dynamic and progressive due to the interconnection between the front wheel frame and the rear wheel frame. Further, the operator and front wheel move in unison as they are directly carried by and connected to the front frame of the vehicle respectively. Therefore, there is no change in the positional relationship between the operator with the front wheel and front frame of the vehicle. On the other hand, the positional relationship of the front wheel, frame and operator does change with respect to the rear wheels.

This vehicle of the illustrated embodiment is propelled by human power, but the present invention is not limited to such arrangements and may employ other sources of power to propel the vehicle. The illustrated embodiment utilizes a conventional bicycle drive train to transmit power to the front wheel. Directional change is imparted by manipulation of hand controls that pivot about a point on the front frame and are connected to the front and rear frame through respective linkages. Manipulation of the hand controls alter the positional relationship of the front frame relative to the rear frame and hence the steered direction of the vehicle. The operator is seated behind the front wheel with their legs enclosing the front wheel between them and their feet resting on the pedals that are located on the crank assembly that is positioned ahead of the front wheel. The operator experiences the same movements as the front wheel and frame due to the consistent relationship between the operator and front frame/wheel assembly.

Construction

The vehicle is preferably constructed primarily of a light weight material such as aluminum to reduce mass, but could be manufactured with different materials and construction techniques to achieve similar functional results.

With reference to the drawings, the vehicle is composed of two frame assemblies. A front frame assembly and a rear frame assembly. The front frame 6 is used to support the front wheel 1, the crank assembly 2 and it's associated drive train components such as derailleurs 3, the main pivot bushing support structure 4, the seat structure and it's adjustment mechanisms, the steering pivot shaft 29 and handlebars 9L, 9R and for the spherically ended linkages 5L, 5R, 11L, 11R that interconnect the front and rear wheel frames 6, 7.

The rear wheel frame 7 may also constructed from aluminum and is used as a support structure for the rear wheels 47L, 47R and corresponding axle 45 and spindle ends 49. The rear frame 7 provides for an attachment to the front frame 6 through five connection points. These include; the main pivot bushing 19, the spherically ended linkage bars 5L, 5R that cooperate with the main pivot bushing 19 to describe the dynamic and progressive pivot axis 43, as well as the spherically ended linkage bars 11L, 11R that connect the rear axle wheel brackets 46L, 46R to hand controls 9L, 9R on the front frame 6 to induce directional change.

The front frame structure starts with two tubes 12L, 12R that form the backbone of the front frame. These tubes are symmetrical about the vehicle's centerline 55. From these tubes are connections to all other significant frame members. With reference to FIG. 1, the main tubes 12L, 12R of the front frame, from front to rear, each first extend obliquely downward and rearward from a point situated over the front wheel at a short distance ahead of the front wheel's rotation axis to a lowermost point of the frame a short distance behind the front wheel at an elevation below the wheel axis thereof. Here, the tube bends to extend rearward in a nearly horizontal orientation, rising only slightly in this run, to a point just ahead of the rear wheels at an elevation below the rotational axes thereof, where the tube bends to continue upward and rearward, but a much greater angle of inclination, to an elevation above the rear tires just behind the rotational axes thereof. From here the main tubes 12L, 12R bend one last time to extend a short distance upward, and slightly forward, to their terminal rear ends above the rear wheels. The portion of the front frame lying over the rear frame at the positions of the rear wheel along the vehicle's longitudinal axis resides entirely in the space between the two rear wheels. The front frame main tubes define the opposing sides of the front frame and are mirrors of one another across the longitudinal central plane of the vehicle.

Turning back to the front of the vehicle, the derailleur mast 13 is carried by the main tubes 12L, 12R where they bend toward one another at their front ends from their otherwise parallel relationship. This mast tube thus serves to connect the frame tube front ends at a common point. The derailleur mast 13 is perpendicular to the frame tubes 12 at the connection thereto in the central vertical plane between the tubes, and the parts are fastened or unified, for example through welding. The derailleur mast 13 terminates at the bottom bracket 14 or bearing housing for the conventional bicycle crank assembly 2. This bearing housing 14 is then triangulated back to the frame on each side through tubing, referred to in the cycling industry as chain stays 15L, 15R. The chain stays connect the bearing housing 14 to the front wheel brackets 16L, 16R. The wheel brackets are then welded or otherwise secured to the frame tubes 12L, 12R. The front wheel brackets 16L, 16R are used to provide for a mounting point for the front wheel 1, disc brake caliper 53 and derailleur 3. The relationship of the derailleur mast 13, bearing housing 14, and derailleur mounting locations should all follow generic guidelines as proposed for standard bicycles to ensure compatibility with off the shelf bicycle components currently available.

As the bearing housing 14 is now constructed in such a way as to provide for structural stability due to it's use of triangulation with the main tubes of the front frame, a support is now be included to reduce the bending moment at the wheel brackets 16L, 16R on the tubular frame members 12L, 12R that form the front frame's backbone. This is accomplished by welding, or other suitable attachment of, a sub structure 4 to the front frame assembly 6. This structure provides frame support for the wheel brackets 16L, 16R, a surface from which a fender 18 can be attached to provide protection to the operator from moving parts such as the front wheel 1 and chain sprocket arrangement 26, as well provide the primary connection point to the rear wheel frame 7 through the pivot bushing assembly of FIG. 6.

Figure 2:
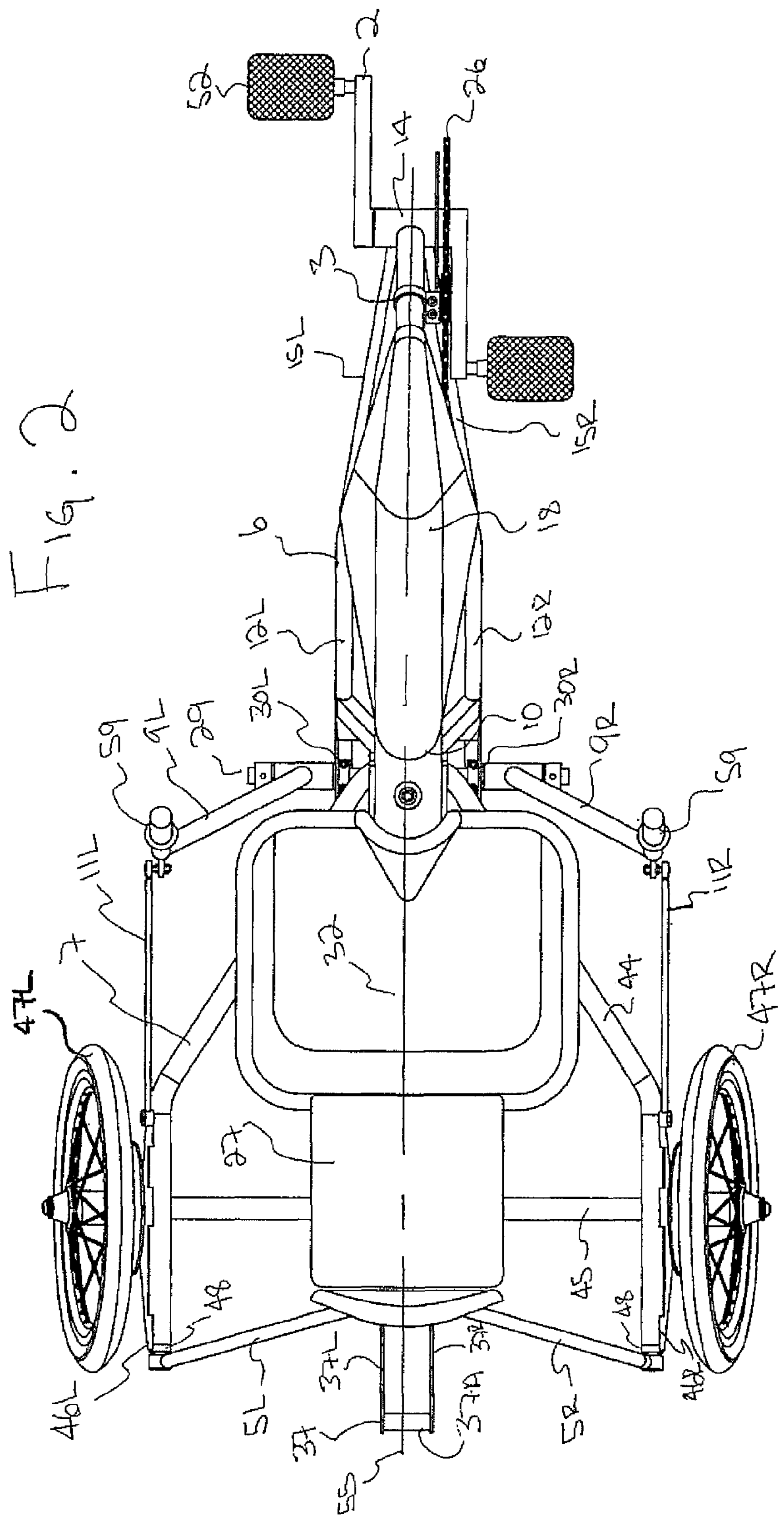
FIG. 2 is a top plan view of the vehicle shown in FIG. 1

This pivot bushing assembly is comprised of two elastomer type bushings. The primary bushing 19 is cylindrical and the secondary bushing 20 is frusto-conical in shape. These bushing are thru bolted to both the front frame 6 and rear frame 7. The flat bushing mounting surfaces provided by a bushing mounting plate 10 (FIG. 2) on the front frame and a corresponding bushing mounting plate 23 (FIG. 3) on the rear frame are arranged to be parallel to one another in a normal on-center condition of the front frame acting to direct the vehicle in a straight line path. These bushings are designed to be distorted when the vehicle is steered. In order to reduce the stress caused by the angular mis-alignment induced between the bushng mounting plates 10, 23, the bolt 21 that connects the bushings to the front frame 6 and rear frame 7 is free to pivot and tilt on a spherical bearing 22 integrated into the bushing mounting plate 10 of the support structure 4 on the front frame 6. To keep the bushings positioned on the bushing plates 10, 23, they are piloted with rings 24, which are welded or otherwise formed on the underside of the top front frame bushing mounting plate 10 and the over and undersides of the bottom rear frame bushing mounting plate 23. The bushing design is not unlike what could be found in the truck of a skateboard, beneath the deck thereof. The components have been scaled accordingly for this larger application, and the spherical bearing 22 is unique to this design.

The pivot bushing support structure 4 also serves as one of the two mounting locations used to secure the seat support rails 25 which extend rearward from the support structure 4 in slightly downward-sloping directions parallel to one another at horizontally spaced positions situated laterally inward from the main tubes 12L, 12R of the front frame. The seat support rails 25 also serve to provide additional front frame reinforcement, as the seat support rails are tied back into the front frame tubes 12L, 12R on each tube via brackets 33 gusseting the bends of the main front frame tubes 12L, 12R just in front of the rear wheels.

Another function of the pivot bushing support structure 4 is to further re-enforce the front frame 6. It adds additional triangulation to the front frame structure. Here you will find bracketry 28 that is designed to gusset the frame tubes 12L, 12R where they are bent just behind the front wheel. These gussets 28 also mount the steering pivot shaft 29. The steering pivot shaft 29 is secured to the pivot mount structure 4 through use of 2-pc shaft collars 30 (FIG. 2), with one half of the shaft collar being welded or otherwise fixed to the pivot bushing support structure frame gusset 28. The steering pivot shaft is a wear surface due to the rotating or pivotal motion of the hand controls 9L, 9R, and therefore is preferably constructed from an anodized aluminum hollow shaft. As it would be costly and unnecessary to anodize the whole frame, this shaft is therefore arranged to be removable for replacement or service. When secured by the shaft collars 30 the steering pivot shaft 29 provides for additional frame integrity as it also serves as a cross member tying the frame tubes 12 together.

As mentioned, the pivot bushing support structure 4 also provides a mounting point for a portion of the seat support rails 25. These seat support rails serve multiple purposes. The seat support rails 25 further triangulate the front frame rails 12, providing additional frame support. They are also profiled such that a pair of seat brackets 31L; 31R can be designed so as to be indexable along the seat support rails 25 length. This indexing results in a seat bracket 31L, 31R and therefore a seat base 32 that can be adjustable by several inches along this length. This provides a flexible vehicle design so as to accommodate a wide range of operators, without changing the vehicles basic layout and configuration.

The seat brackets 31L; 31R depend perpendicularly downward from a bottom of the seat base to each lie just laterally outward from a respective one of the seat rails. Two cross-bars 31A, 31B span perpendicularly between the two seat brackets over the support rails 25 at respective positions along the top edges thereof. The support rails 25 each have a saw-tooth profile 25*a* at its top edge near the front end of the rail, producing downward depending slots into which the front cross-bar 31A can fit. The profile of each support rail matches and aligns with the profile in the top edge of the other rail support. Closer to a rear end of the rail, the profile of each rail's top edge features a single longitudinal slot-like recess 25*b* that runs in a longitudinal direction of the rail for a length matching that of the series of downward slots at the saw-tooth profile 25*a* at the front end of the rail. Accordingly, with the front cross-bar 31A received in any one of the downward slots of the saw-tooth profile 25*a*, the rear cross bar will be seated within the longitudinal slot 25*b*. With the seat's front cross-bar 31A engaged in any aligned pair of slots, the weight of the seat and any rider thereon gravitationally retains the seat in this position along the rail supports. Further locking of the seat into a selected position is provided by virtue of a clamping force induced when thumbscrews 31C are tightened and consequently clamp seat rails in desired position. The thumbscrews 31C are threading engaged on opposing threaded ends of a shaft 31D passing perpendicularly through the seat brackets 31L, 31R below the support rails 25, so that the rotation of each thumbscrew in a tightening direction pushes the respective seat bracket against the outer face of the respective rail to lock the position of the seat base.

In order to effect change of the seat bottom position, the seat base 32 and consequently the seat brackets 31L, 31R need to be tilted upward at its forward end (i.e. counter-clockwise in FIG. 1) to disengage the front cross-bar 31A of the brackets 31L, 31R from the downward and rearward extending slots of the saw tooth profile 25A machined into the seat support rails 25, thereby lifting the top cross-bar out of its current slots in the top of the rails. At this point, the seat base is free to be slid fore or aft along the support rails 25 at the sliding interface between the rear cross-bar 31B and the longitudinal rail slot 25*b* in order to move the front cross-bar 31A to another pair of aligned slots to accommodate a suitable seating position for the operator. There is also recline adjustment 37 available for the seat back 27 which will be discussed later.

As mentioned, the seat support rails 25 mount at their front ends to the pivot bushing support structure 4 and at their rear end to a common set of brackets on the frame 33 via cross member 34 (FIG. 3) that completes the connection. Extending rearward from this cross member 34 is a section of tube 35 that slopes upward and rearward to just above the rear extremity of the frame tubes 12L, 12R at a laterally central position between the frame tubes. At this point, there is an upper spherical end attachment plate 36 that is fixed in place on the frame tubes to span thereacross and a seat recline adjustment barrel 38 that is fixed to the top end of the central tube 35 to extend perpendicularly thereacross. This central tube 35 further triangulates the front frame assembly 6, as well as provides for a fixed point relative to which the seat back reclining angle is adjusted. The seat back 27 of the illustrated embodiment features a c-channel 39 section running the length of the seat back 27 with the flat central span of the c-shape fixed to the rear surface of the seat back so that the two parallel outer legs of the c-shape project rearwardly and perpendicularly therefrom. From this channel 39 extends the seat back recline assembly 37, which features two linear rails 37L, 37R attached to the respective legs of the c-channel on the inside thereof by a pivot pin 40. Distal ends of these rails are interconnected by a perpendicular cross-member 37A. The recline assembly 37 attaches to the C-channel 39 and pivots about pin 40 in order to compensate for angular changes as a result of seat base 32 adjustment and seat back 27 adjustment.

Figure 7:
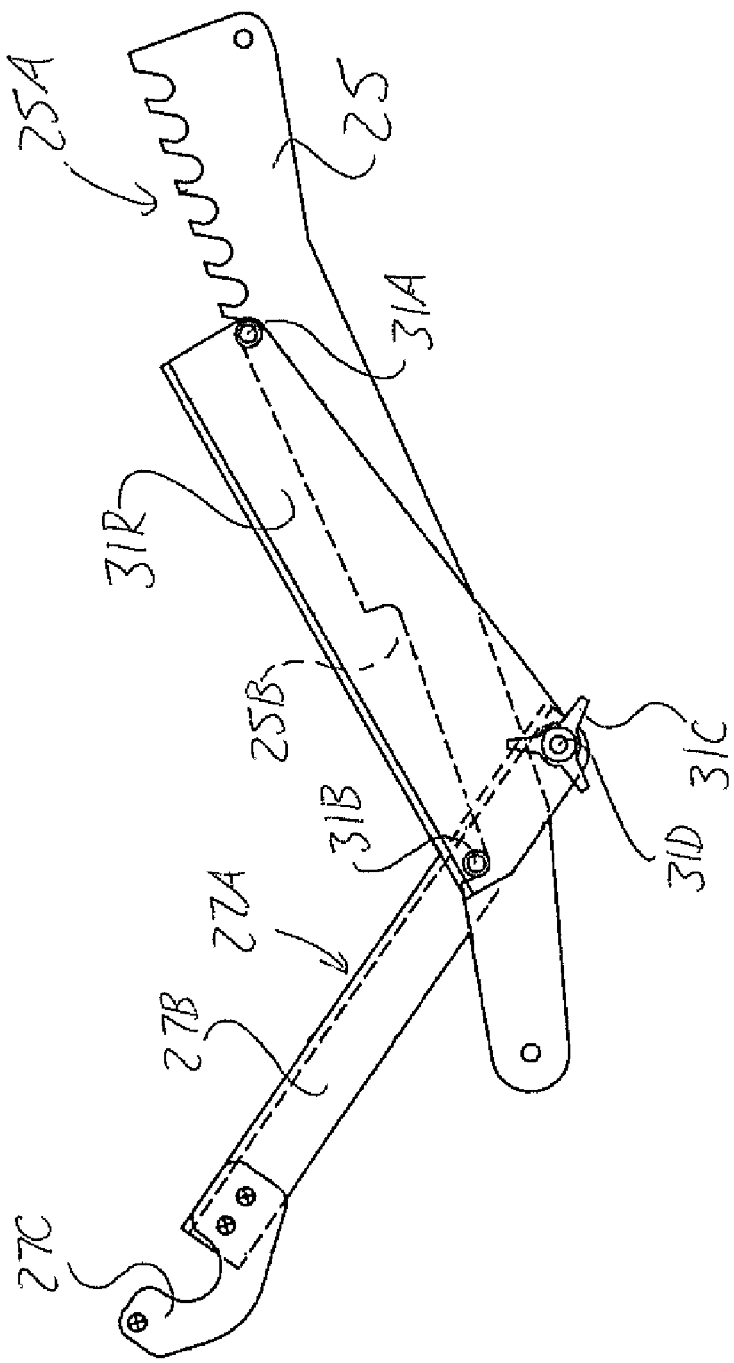
FIG. 7 is a side elevational view of a seat adjustment mechanism of the vehicle shown in FIG. 1.

The recline adjuster has two profiled cutouts, one in each of the adjuster rails 37L, 37R, presenting a saw tooth profile with a number of slots from which a reclined positions of the seatback can be selected by the operator. The adjuster is operated by loosening of provided thumbscrews 41 that threadingly engage into respective ends of the barrel section 38, which is welded or otherwise fixed to support tube 35, through the respective profiled cutouts in the adjuster rails. The seat back 27 pivots relative to the seat base 32 by way of a pivotal connection to a seat back support 27A rigidly fixed to the seat brackets 31L, 31R at a position between the seat support rails 25, as shown in FIG. 7. The illustrated seat back support 27A features a downward and rearward opening C-shaped channel 27B, and the rear cross-bar 31B of the seat base and end-threaded shaft 31D of the seat base's locking mechanism cross-through side walls of the C-channel to fix it to the seat brackets 31L, 31R. The channel 27 extends upward and rearward from the seat brackets 31L, 31R to cooperate therewith to support a molded seat pan. At a rear upper end of the C-channel 27B, the seat back support 27A features a hook-shaped bracket 27D mounted to each side wall, a mouth of the bracket's hook shape opening upward and forward to present a cradle for pivotally receiving a lower cross-bar of the seat back 27.

By loosening of the thumbscrews 41 out of their tightened positions clamping the adjuster rails against the barrel 38, the seat back can be rotated about its pivotal connection to the seat base 32 to change which of the slots along adjuster rail cutout profile the barrel 38 aligns with, at which point retightening of the thumbscrews into the barrel at the selected pair of aligned slots in the adjuster rails is performed to lock the seat back angle corresponding to this selection. Complete removal of the thumbscrews allows the entire removal of the adjuster bracket from around the barrel so that the seat back can be pivoted fully forward to rest on the fender 18, thereby putting the vehicle in a collapsed condition for ease of transport due to it's shorter overall height resulting from this full forward lowering of the seat back.

In another embodiment, instead of a cross-shaft 31D threaded at its opposing ends to engage internally threaded thumbscrews 31C of the seat base locking mechanism, nutserts or other internally threaded pieces may be employed to produce an threaded hole in each side of the seat back support 27*a* under the support rails 25 for engagement by an externally threaded thumbscrew into the nutsert through an opening in the respective seat bracket 31L, 31R. Tightening of the thumbscrew would thereby pull the respective seat bracket 311, 31R inwardly toward the seat back support 27A, thereby clamping it against the respective support rail 25 to sandwich the respective support rail 25 between the seat bracket 31L, 31R and the seat back support 27A.

Figure 5:
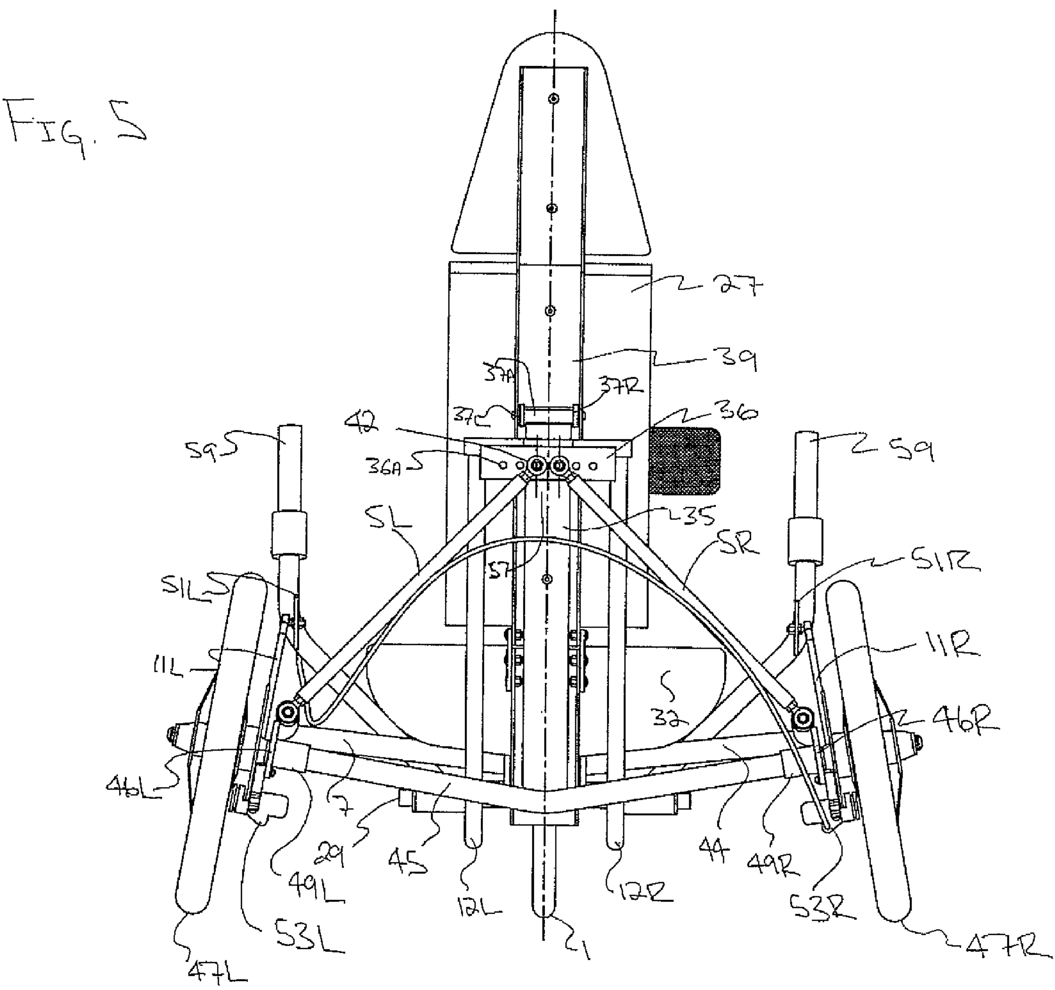
FIG. 5 is a rear elevational view of the vehicle shown in FIG. 1

The spherical bearing attachment plate 36 is the connection point for the spherically ended links 5L, 5R that connect the front frame 6 to the rear wheel frame 7. With reference to FIG. 5, there are several holes 36A in this plate 36 that provide for different mounting locations of these spherical links 5L, 5R to alter the dynamic pivot axis 43 of the vehicle. That is, to each side of a central longitudinal plane of the front frame and seat (i.e. the same plane as that in which the front wheel rotates), there are multiple mounting holes in the plate 36 available for selection as the spherical joint connection point between the link arm 5 and the front frame on that side of the front and rear frames. In the illustrated embodiment, there are six mounting holes 36A arranged in a straight line perpendicularly crossing the central longitudinal plane of the front frame, three on each side thereof. This pivot mount upper frame region of the front frame is further enforced by using brackets 33A welded to the frame tubes 12L, 12R at the most rearward corner or bend in their designed profile. The force exerted by the operator on the seat back is also directed to counter-act forces exerted by the linkage bars 5L, 5R on the spherical end attachment plate 36.

Figure 3:
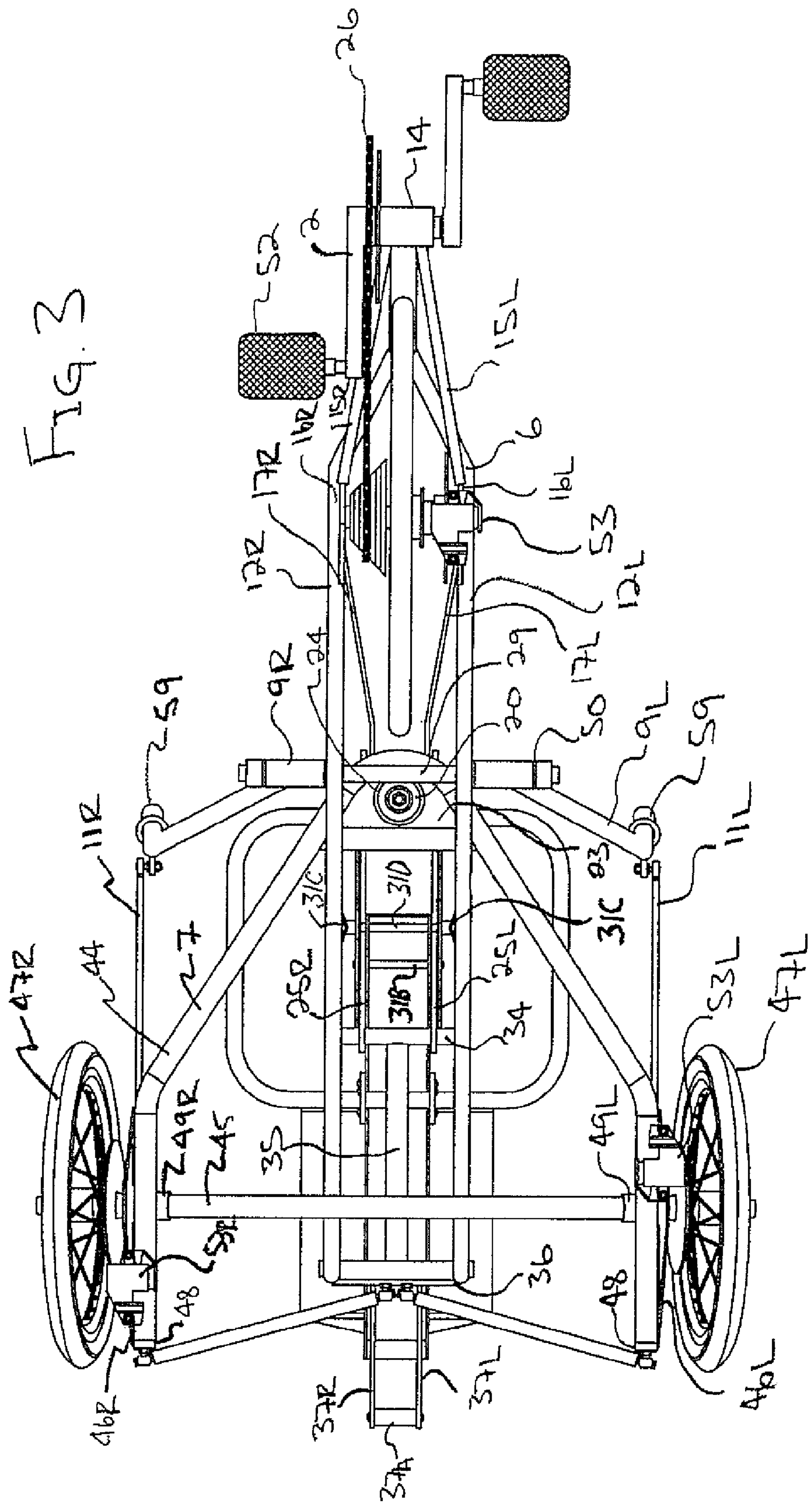
FIG. 3 is a bottom plan view of the vehicle shown in FIG. 1
Figure 4:
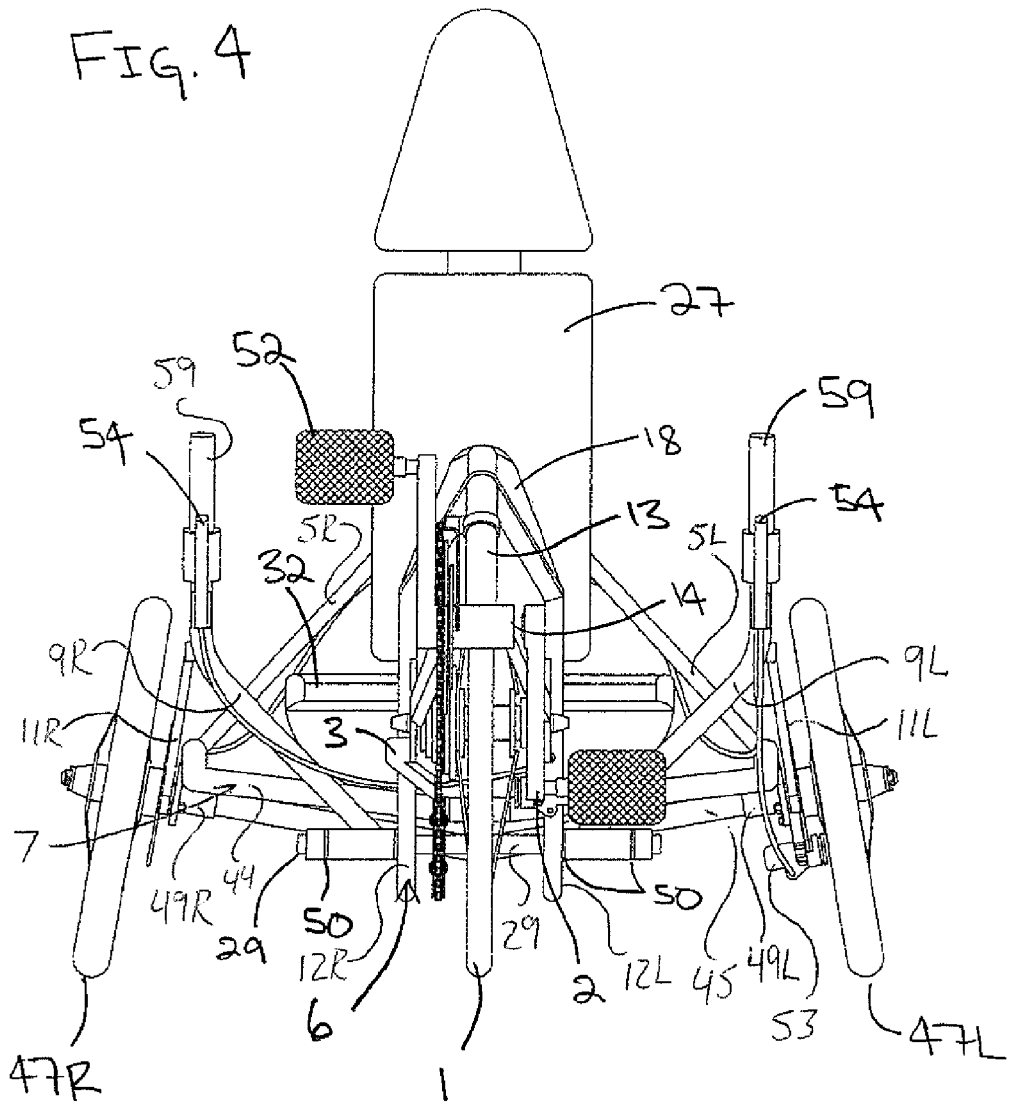
FIG. 4 is a front elevational view of the vehicle shown in FIG. 1
Figure 6:
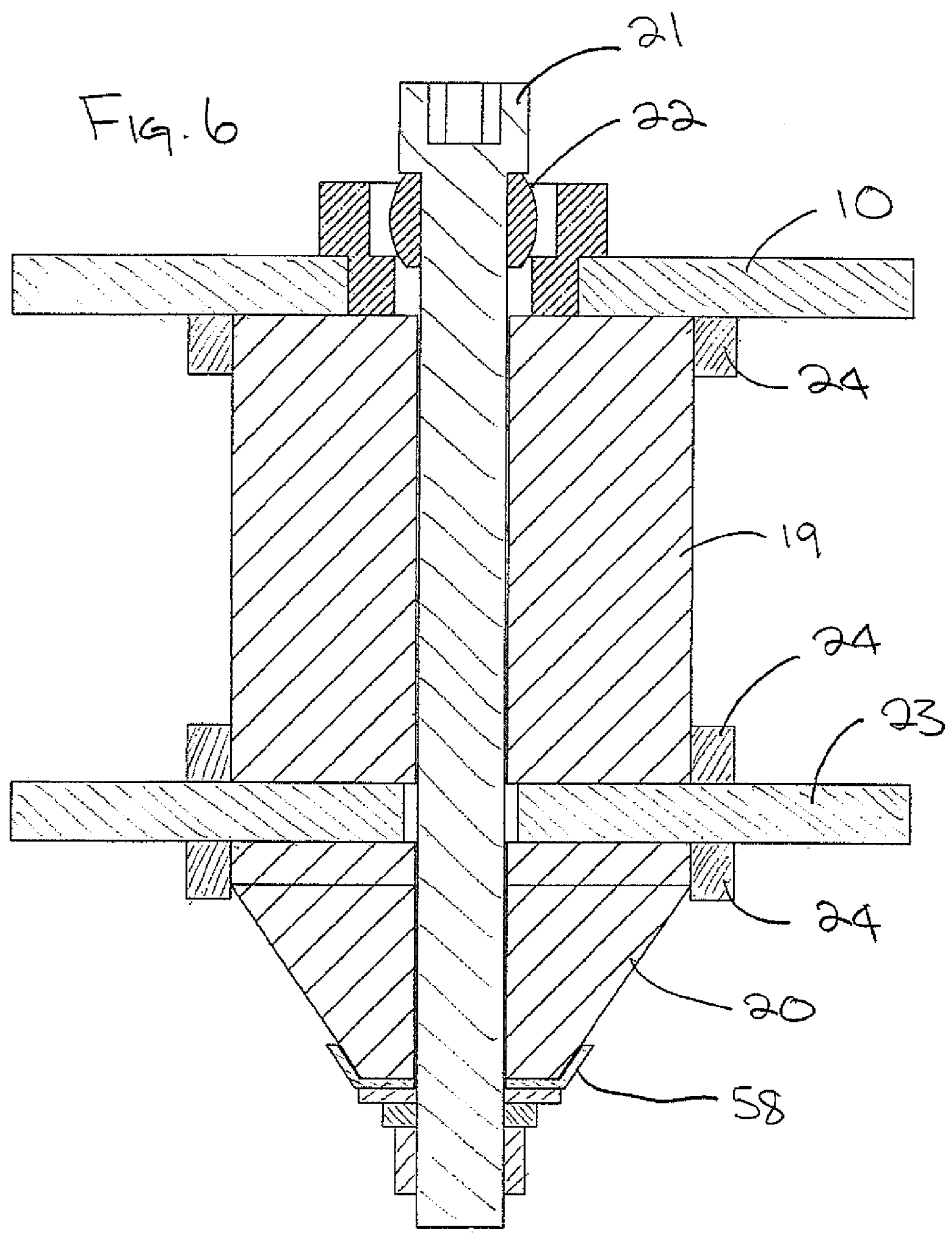
FIG. 6 is a cross-sectional view of a pivot bushing assembly connecting front and rear frame sections of the vehicle.

The rear frame assembly 7 can be described as a profile representing the letter "A" in plan view, as best shown in the bottom view of FIG. 3. This structure is formed accordingly and serves to provide the bushing plate 23 at the apex of the "A" where the bushing assembly of FIG. 6 is bolted, sandwiching the bushing plates 10, 23 of the front 6 and rear 7 frame assemblies across the resilient bushing elements at this flexible connection. The bushings 19, 20 are also piloted in this structure through use of pilot rings 24 as described with the pivot bushing support structure. There is further use of a cupped washer 58 to maintain concentricity between the conical bushing 20 and the thru bolt 21 as well as a spherical bearing 22 to facilitate thru bolt rotation on vehicle articulation.

Found at the lower legs of the rear frames A-structure are the wheel attachment brackets 46L, 46R. These plates are parallel with the wheels 47L, 47R and may be obliquely inclined from vertical, for example to 20 degrees per wheel sloping upwardly inward from vertical planes. Such inclination provides two benefits. It cambers the wheels 47L, 47R for reduced side loading in cornering, and as well helps to strengthen the rear frame structure 7 against the loading induced by the spherical ended links 5L, 5R interconnecting the front 6 and rear 7 frames together. The wheel brackets 46L, 46R, as well as connecting the wheel axle spindles 49L, 49R to the tubular "A" frame 44, are also designed to mount conventional bicycle disc brake calipers 53, as shown for the right wheel in FIG. 5. These wheel brackets also provide for attachment of the spherical end linkages 11L, 11R used for directional control of the vehicle. The spherically ended linkages 5L, 5R that describe the pivot axis 43 are attached at the ends of the "A" frame thru machined end caps 48. These caps 48 are welded or otherwise fixed in or on the tube ends of the "A" frame 44 and feature threads to accommodate the studded spherical ends 42 that are a component of the spherical joint to the linkage bars 5L, 5R. The spherical joint at each end of each spherically ended link 11L, 11R, 5L, 5R will be understood to permit multi-directional motion of the link relative to the component it is joined to, i.e. allowing pivoting about each of three orthogonal axes.

The additional component completing the A-frame structure of the rear frame is the axle tube 45. This tube connects the axle spindles 49L, 49R into a single unit. As shown in FIG. 5, this tube 45 is bent at an angle in the illustrated embodiment to accommodate the camber that is built into the rear wheels 47L, 47R.

Steering controls are symmetrical about the vehicles centerline 55. The handlebars 9L, 9R may be constructed from aluminum tubing of like diameter to bicycle handlebars in order to utilize conventional accessories like grip shifters 59 and brake levers 54. The handlebars pivot about the steering pivot shaft center 8, The steering pivot shaft 29 described previously constitutes a component of the front frame 6 assembly and is specifically connected to the pivot bushing support structure 4 and the gussets 28 that support the front frame tubes 12L, 12R. The steering handles 9L, 9R are bushed 50 on the pivot shaft 29 for ease of rotation and reduced wear. They are also tabbed 51 to provide a mounting point for spherically ended linkage bars 11L, 11R that connect the handlebars to the rear axle wheel brackets 46 on each side of the rear frame.

Operation

The vehicle is propelled like a bicycle. The operator engages the pedals 52 which turn a crank 2, which turn a sprocket and chain 26 to turn a sprocket that is connected to the front wheel 1, which in turn propels the vehicle forward. Gear changes in multi-geared embodiments are also as per conventional means with either a multi-sprocket derailleur 3 configuration or other conventional gear changing device as designed for bicycles, easily incorporated. The primary difference from either a conventional bicycle or tricycle is the position of the operator, whom is seated in a lowered and reclined position. This is sometimes referred to as a recumbent position. The pedals 52 are now forward of the operator, but function in the same fashion. Braking is also akin to conventional standards. The hardware is common with bicycles, but the orientation of the brake levers 54 is conducive to the handlebar layout. There is additional stopping power available, by virtue of one additional braked wheel 47. The vehicle is preferably steered by manipulation of the hand controls 9L, 9R, but can also be successfully controlled through shifting of the upper body to rotate the front frame 6 about the dynamic pivot axis 43. However the vehicle is most positively steered through the handlebars 9L, 9R, with upper body movement providing additional counteraction to centrifugal forces when cornering.

For example, to initiate a left turn, the operator would push forward on the left handle bar 9L, and the right handle bar 9R will move rearward, but by a reduced amount compared to the forward travel distance of the left handle bar due to optimization of handlebar and steering linkage design. This feature is designed into the vehicle by sweeping the handlebars 9L, 9R rearward and upward from their connections to the steering pivot shaft 29 to their connections to the steering linkages 11L, 11R, which in turn then connect to the rear frame 7. This geometry was derived for several reasons. At maximum articulation, the handlebars must not move out of the natural reach of the operator's arms in either direction. In order for the operator to impart maximum leverage on the vehicle, the handlebar must be positioned such that it is readily at hand when exercising their maneuvers.

With reference to a longitudinal axis of the front frame, which lies in the front wheel's plane and is perpendicular to an axis 60 that perpendicularly intersects the wheel's axis and the ground in that plane, the angling of each handlebar to slope up and back from its pivot 8 on the front frame to the linkage 11 means that the ratio of travel of the linkage 11 along the front frame's longitudinal axis to angular movement of the handlebar about its pivot 8 increases as the handlebar is moved forward from its default upward and rearward sloping position. On the other hand, the ratio of travel of the linkage 11 along the front frame's longitudinal axis to angular movement of the handlebar about its pivot 8 decreases as the handlebar is pivoted rearward from its default upward and rearward sloping position. The travel of the linkage thus progressively changes with the handlebar position, as the relationship between the travel and the amount of rotation about the pivot point 8 is not linear. In the illustrated embodiment, each handlebar 9 has a range of pivotal movement of about 45-degrees about its pivotal axis, as bound by the maximum tilt of the front frame in one direction and the maximum tilt of the front frame in the other direction.

The pivot axis 43 can be viewed as a theoretical axis that the vehicle frames articulate about relative to one another. This pivot or articulation axis linearly passes through the main pivot bushing 4, sloping upward and rearward centrally through an imaginary axis passing linearly through the two spherical joints of the linkage bars 5L, 5R to the attachment plate 36 at the rear of the front frame. Because of the multi-linkage interconnection between the front 6 and rear 7 frames, the axis 43 shifts as the vehicle is turned. The result is an axis 43 that is dynamic as its angle of inclination changes as well as its position relative to the vehicle's longitudinal centerline 55 (i.e. relative to the central vertical plane bisecting the horizontal distance between the rear wheels). As the vehicle frames articulate about the axis 43, the axis becomes progressively impacted as the vehicle is articulated. When viewed from the rear FIG. 5, it can be envisioned that the linkage bars 5L, 5R connecting the front and rear frame sections will collapse on one side of the vehicle and incline on the other side of the vehicle for any given direction of vehicle turn. This action shifts the pivot axis 43 away from the vehicle centerline 55 at this connection point, thus moving the pivot axis 43 out of alignment with the vehicle's central longitudinal plane. The greater the articulation, the more pronounced this shift or misalignment becomes. This is advantageous to the vehicles handling because a relatively shallow pivot axis 43 of 15 to 40-degrees from horizontal can be integrated to impart predictable handling at speed. The closer to vertical (90 degrees) the pivot axis angle becomes, the more aggressively the vehicle will turn at any given rotation about the axis 43. However if the shallow pivot axis is static, the vehicles turning radius would be increased accordingly. With the realization of a dynamic axis, best handling characteristics can be designed into the vehicle geometry. As the axis changes with articulation, it provides for progressively greater angular change of the front wheel relative to the rear axle, resulting in improved maneuverability. On-center stability is achieved because the pivot axis is preferably on plane (coplanar) with the vehicle centerline, or in the case of the illustrated embodiment, close to being on plane therewith. Another advantage the dynamic axis provides is additional clearance for various frame members. As the vehicle is articulated, the seat 32 and front frame 6 shift off-center about the main pivot bushing 19. As the front frame section is leaned into the corner, the seat position shifts to the outside radius of the corner. This allows for clearance most notably around the perimeter of the seat 32 to the rear axle frame 44. The result is the adoption of a lowered seat height 32 and consequently a lower center of gravity. This could not be realized if this was a fixed pivot vehicle without increasing the width between the rear wheels.

The pivot axis 43 has another important feature that also should be noted. The pivot axis is positioned such that castor or trail is built into vehicle's geometry with respect to the pivot axis. An example of this castor effect can be found on a grocery store shopping cart. In observation of the castor wheel supporting the cart, it will be noted the castor wheel is inclined to trail when the cart is pushed forward. In bicycle terms, this is referred to as "trail" and is standardized in that industry at approximately 1.5 to 2-inches. Trail is measured on a bicycle by extending the head tube (the tube in which the front fork rotates) angle to the ground. Another line is drawn from the centerline (i.e. rotational axis) of the front wheel to a point intersecting the ground in a direction perpendicular thereto, thereby marking the wheel's point of contact with the ground and the lowermost point of its rotational path if the ground surface is horizontal. The measured distance along the ground between these points of ground intersection is the trail of that particular vehicle. In the terms of this invention, the head tube or fork angle is replaced with the pivot axis 43, and the centerline of the front wheel perpendicular to the ground 60 remains the same. The pivot axis intersects the ground at a point forward of the vertical line perpendicular to the wheels centerline. In the preferred embodiment shown in FIG. 1, the trail is measured as 3-inches in front of the wheel-axle intersection line 60 drawn perpendicular to the ground. Without such trail, the consequence would be akin to pushing the shopping cart castor wheel backwards and hoping it remained in position.

Progressing along the pivot axis, the next critical point occurs through the centroid of the cylindrical pivot bushing 19. As the vehicle articulates, there is flexure or a twisting moment induced in this bushing 19. One side of the bushing will compress and the other will extend by virtue of having the clamping load between the plates redistributed. The conical bushing 20 is designed to provide a soft connection and provide a minimum resistance to the main bushings distortion. Vehicle handling is tuned by the durometer of the bushings 19, 20 and the clamp loads induced by the thru bolt 21. The bushings also serve an additional purpose. They are designed with resilient materials that have memory. The tendency is to return to their original shape. The result of this memory is a vehicle that returns to center on release of any force applied to the bushings in order to articulate the vehicle.

With further regard to the pivot axis, the pivot axis 43 also lies on the centroid of the upper spherical ends 42 in one plane; this can be observed by side view FIG. 1 However, if viewed from the back view, FIG. 5 it is obvious, the spherical ends 42 are offset perpendicular to the pivot axis 43 in a symmetrical fashion. The further away from the vehicle centerline 55 these connection points are from the centerline 55, the more upright the linkage bars 5L, 5R become in terms of their normal positions in the on-center or straight default orientation of the front frame. The net result of this is an accelerated shifting of the pivot axis from the vehicle centerline for the same amount of operator input through handlebar movement. This geometric manipulation is the similar as that described for the handlebars 9L, 9R and their associated linkages 11L, 11R. The linkage travel can be optimized through careful design. As the incline of the spherically ended linkages 5L, 5R approaches vertical in their normal positions, their impact on the frame movement is maximized. As these angles of inclination of linkages 5L,5R increase, the vehicle will be come off of center quicker and realize increased travel as compared to a linkage that is angled as depicted in FIG. 5. Although this can create a vehicle that can be turned in much quicker and with a smaller turning circle, the trade off is increased sensitivity at speed. This can be undesirable because when the vehicle is operated, there are forces induced on the articulated front frame because of the action of pedaling the vehicle. Given that pedaling motion results as an input to steering, sensitivity to this input is best reduced for pedaling at speed and in a relatively straight line. It is therefore intentional to reduce sensitivity to any input when the vehicle is on center.

Due to the dynamic pivot axis of the vehicle, its geometry can be optimized through use of preferred pivot axis, castor and linkage bar angles and linkage bar offset from centerline at the upper pivot mount, such that the vehicle can be been designed with a reduced sensitivity to forces that can impact its stability whilst on center and at speed. Through the integration of castor and a progressively sensitive dynamic pivot axis, pedal induced oscillations, road irregularities and operator inputs can be mitigated as having a significant impact on vehicle handling at speed. The dynamic pivot axis further provides for an extremely maneuverable vehicle as the pivot axis is progressive through its change of inclination and position relative to the vehicle centerline based on the degree of operator input to impart directional change.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A vehicle comprising:

a front frame section;

a seat for a rider carried on said front frame section;

a front wheel rotatably journaled on said front frame section at a front axle axis at a distance ahead of the seat;

a rear frame section;

a pair of rear wheels spaced transversely from one another and rotatably journaled on the rear frame section adjacent opposite sides thereof at a rear axle axis at a distance behind the front axle axis;

a flexible joint between the front and rear frame sections at a location disposed ahead of the seat and the rear axle axis and behind the front axle axis, the flexible joint enabling relative pivoting of the frame sections about a tiltable axis of said flexible joint; and a pair of link arms connected between the front and rear frames at a distance behind the flexible joint, each link arm inclining from a first connection to the rear frame adjacent a first side thereof to a second connection to the front frame, each connection of each link arm enabling pivoting thereof about three orthogonal axes;

wherein a dynamic articulation axis intersects the flexible connection and an imaginary axis extending through the second connections of the link arms to the front frame, the front frame being tiltable relative to the rear frame to shift the dynamic axis relative to either side from a default position positioning the front wheel in a straight orientation relative to the rear wheels.

2. The vehicle of claim 1 wherein the flexible connection comprises an elastomeric spacer disposed between parts of the front and rear frames and a fastener interconnecting said parts of said frames through a hole in the elastomeric spacer, an axis of the fastener defining the tiltable axis of the flexible connection.

3. The vehicle of claim 2 comprising a second elastomeric member disposed to a side of the other part opposite the one part featuring the spherical bearing, the fastener additionally passing through said second elastomeric member.

4. The vehicle of claim 3 wherein the second elastomeric is frustoconical in shape and increases in width moving toward the parts of the front and rear frames.

5. The vehicle of claim 1 wherein the fastener is seated on one of said parts by a spherical bearing accommodating the tilting of the fastener relative to the one of said parts.

6. The vehicle of claim 5 wherein the fastener comprises a bolt.

7. The vehicle of claim 1 wherein the connections of each link arm to the front and rear frames comprise spherical joints.

8. The vehicle of claim 1 wherein the connection of each link arm to the front frame occurs on a respective side of a longitudinal plane of the front frame in which the front wheel rotatably lies.

9. The vehicle of claim 8 comprising multiple link rod connection points on each side of the longitudinal plane of the front frame, the connection of each link arm to the front frame being selectively releasable for reconnection at a different selected one of said connection points to change the position of said connection to the front frame.

10. The vehicle of claim 1 wherein the link arms are positioned behind the seat.

11. The vehicle of claim 1 wherein a position of the seat along the front frame is adjustable.

12. The vehicle of claim 11 wherein a series of seat engaging areas are defined at spaced positions along the front frame, the seat being selectively disengagable from any of said engagement areas and re-engagable to the front frame at another of said engagement areas.

13. The vehicle of claim 12 wherein the seat engagement areas comprise slots in longitudinal members of the front frame, the seat comprising transverse cross members sized to seat within the slots.

14. The vehicle of claim 1 wherein a reclining angle of a seat-back portion of the seat is adjustable.

15. The vehicle of claim 14 wherein the seat back portion of the seat is pivotally connected to a seat-bottom portion of the seat and a seat back adjustment device is operable to selectively change a relative point of locking engagement between the seat back and the front frame.

16. The vehicle of claim 15 wherein the series of slots are provided in a bracket pivotally carried on a respective one of the seat back portion and the front frame and a position of the seat bottom along the front frame is adjustable, pivoting of the bracket accommodating relocation of the of the seat bottom portion.

17. The vehicle of claim 14 comprises a series of slots and a lock engagement point on opposing ones of the front frame and the seat back, and a locking member selectively engagement with said lock engagement point through any of said slots.

18. The vehicle of claim 1 comprising:

a steering handle extending upward from the front frame at position laterally outward from the seat on each side thereof proximate a front end of the seat, each steering handle being pivotal relative to the front frame about a transverse axis extending thereacross; and a respective steering link connected between each steering handle and the rear frame on the same side of the seat as said steering handle, connections of each steering link to the steering handle and rear frame at opposites ends of said steering link being pivotal about three orthogonal axes.

19. The vehicle of claim 1 wherein the dynamic articulation axis intersects the ground ahead of a contact point of the front wheel with the ground.

20. The vehicle of claim 1 wherein the dynamic articulation axis intersects the ground at an angle of between 15 and 40 degrees inclining upward and reward from the ground.

* * * * *